(12) United States Patent
Bandy (10) Patent No.: US 7,423,525 B2
(45) Date of Patent: Sep. 9, 2008

(54) METHOD AND APPARATUS FOR A PRODUCT INFORMATION INTERFACE UTILIZING RADIO FREQUENCY IDENTIFICATION (RFID) TECHNOLOGY

(75) Inventor: William R. Bandy, Gambrills, MD (US)

(73) Assignee: Symbol Technologies, Inc., Holtsville, NY (US)

( * ) Notice: Subject to any disclaimer, the term of this patent is extended or adjusted under 35 U.S.C. 154(b) by 188 days.

(21) Appl. No.: 11/190,882

(22) Filed: Jul. 28, 2005

(65) Prior Publication Data

US 2007/0024436 A1    Feb. 1, 2007

(51) Int. Cl.
G08B 26/00    (2006.01)
(52) U.S. Cl. .................. 340/505; 340/5.9; 340/5.91; 340/5.92
(58) Field of Classification Search ............ 340/5.9, 340/505, 5.91, 5.92
See application file for complete search history.

(56) References Cited

U.S. PATENT DOCUMENTS

| | | | |
|---|---|---|---|
| 5,995,019 A | 11/1999 | Chieu et al. | |
| 6,002,344 A | 12/1999 | Bandy et al. | |
| 6,107,910 A | 8/2000 | Nysen | |
| 6,127,928 A | 10/2000 | Issacman et al. | |
| 6,211,811 B1 | 4/2001 | Evers | |
| 6,433,671 B1 | 8/2002 | Nysen | |
| 6,512,919 B2 * | 1/2003 | Ogasawara | 455/422.1 |
| 6,531,957 B1 | 3/2003 | Nysen | |
| 6,577,861 B2 * | 6/2003 | Ogasawara | 455/419 |
| 6,580,358 B1 | 6/2003 | Nysen | |
| 6,950,009 B1 | 9/2005 | Nysen | |
| 6,975,856 B2 * | 12/2005 | Ogasawara | 455/419 |
| 7,075,436 B2 | 7/2006 | Shanks et al. | |

FOREIGN PATENT DOCUMENTS

| | | |
|---|---|---|
| EP | 1 460 592 A1 | 9/2004 |
| WO | WO 01/06401 A1 | 1/2001 |
| WO | WO 02/103645 A2 | 12/2002 |
| WO | WO 2005/043446 A2 | 5/2005 |

OTHER PUBLICATIONS

Search Report, dated Feb. 22, 2007, for International Application No. PCT/US06/27642, 7 pgs.

* cited by examiner

*Primary Examiner*—Daryl C Pope
(74) *Attorney, Agent, or Firm*—Sterne, Kessler, Goldstein & Fox PLLC (57) ABSTRACT

Methods, systems, and apparatuses to improve an interface between customers and products in warehouse, shopping, and additional environments, including an improved interface with items associated with RFID tags, are described. In an aspect, a product database associated with a merchant is downloaded from a computer system into a mobile device. The downloaded product database is stored. A user interacts with data of the downloaded product database on the mobile device. In a further aspect, a radio frequency identification (RFID) tag is read by the mobile device to determine an identification number corresponding to the RFID tag. The identification number of the RFID tag is transmitted to the computer system. A response from the computer system is received that includes information regarding an item associated with the RFID tag.

28 Claims, 10 Drawing Sheets

METHOD AND APPARATUS FOR A PRODUCT INFORMATION INTERFACE UTILIZING RADIO FREQUENCY IDENTIFICATION (RFID) TECHNOLOGY

BACKGROUND OF THE INVENTION

1. Field of the Invention

The present invention relates generally to radio frequency identification (RFID) technology. More particularly, the present invention relates to an RFID device that functions as a product information interface, and processes that relate to the same.

2. Related Art

Radio frequency identification (RFID) tags are electronic devices that may be affixed to items whose presence is to be detected and/or monitored. The presence of an RFID tag, and therefore the presence of the item to which the tag is affixed, may be checked and monitored by devices known as "readers." Readers typically transmit radio frequency signals to which the tags respond. Each tag stores a unique identification number. The tags respond to the reader transmitted signals by providing their identification number, bit-by-bit, so that they can be identified.

RFID tag and reader technology has many applications. For example, RFID tags and readers can be used to enhance retail inventory environments, where readers can be used to read tags attached to objects in a warehouse to take an inventory of the objects. Thus, RFID technology aids businesses in taking inventory, for example. However, RFID technology does not currently improve the interface between customers and products, as the information stored in tags is not currently accessible by customers.

Thus, what is needed are ways of leveraging RFID technology to improve an interface between customers and products in warehouse, shopping, and additional environments.

SUMMARY OF THE INVENTION

The present invention is directed to methods, systems, and apparatuses to improve an interface between customers and products in warehouse, shopping, and additional environments, including an improved interface with items associated with RFID tags.

In a first aspect, a product database associated with a merchant is downloaded from a computer system into a mobile device of a user, such as a customer. For example, the product database can be downloaded when the user approaches or enters the store of the merchant. The downloaded product database is stored. The user interacts with data of the downloaded product database on the mobile device. This interaction improves the user's ability to transact business with the merchant, for example.

In a further aspect, a radio frequency identification (RFID) tag is read by the mobile device to determine an identification number corresponding to the RFID tag. The identification number of the RFID tag is transmitted to the computer system. A response from the computer system is received that includes information regarding an item associated with the RFID tag.

Furthermore, in an aspect, the user inputs an information request to the mobile device regarding an item. The information request is used to obtain information regarding the item, such as from a computer system.

In another aspect, the user interacts with the mobile device to search a network for an item. On the mobile device, the user selects an entity located over the network that has the item.

In an aspect of the present invention, a mobile device includes a communications module configured to download a product database from a computer system of a merchant upon interaction by a user with the user interface. The product database includes data associated with items provided by the merchant. The storage device stores the downloaded product database. The user interface enables interaction with the data, including display of data of the downloaded product database.

In a further aspect, the mobile device includes a reader module configured to read a radio frequency identification (RFID) tag associated with an item to determine an identification number corresponding to the RFID tag. The communications module is configured to transmit the identification number of the RFID tag to a computer system of the merchant, and to receive a response from the computer system that includes information regarding the item.

In another aspect, the mobile device allows a user to search a network for an item.

These and other advantages and features will become readily apparent in view of the following detailed description of the invention. Note that the Summary and Abstract sections may set forth one or more, but not all exemplary embodiments of the present invention as contemplated by the inventor(s), and thus, are not intended to limit claims.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION 1.0 Overview

The present invention provides improved devices, processes, and systems for enhancing interaction with items in a shopping, warehouse, or other environment. Furthermore, the present invention enhances interaction with items associated with RFID tags. The following sections describe exemplary embodiments of the present invention.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

2.0 Exemplary Embodiments of the Present Invention

As described above, the present invention provides improved processes and systems for enhancing interaction with items in a shopping (or other) environment, including enhancing interaction with items associated with RFID tags. A user utilizes a mobile communications device to interact with the items. In an embodiment, the mobile communications device is used to download a product database of a merchant, such as at a time when the user nears or enters the store of the merchant. In a further embodiment, the user can interact with the mobile communications device to download additional information about selected items of the merchant. In a still further embodiment, the user can utilize the mobile communications device to interrogate a tag associated with an item of interest to identify the item, and to use the identification information to download further information about the item.

In yet another embodiment, the user interacts with the mobile communications device to search a network (such as the Internet) to locate a desired item and to find the nearest merchant that has the item in inventory. The user can further interact with the mobile communications device to place the item on hold at the nearest merchant, for possible purchase, and/or to alert the merchant that the user will be visiting the merchant.

Figure 1:
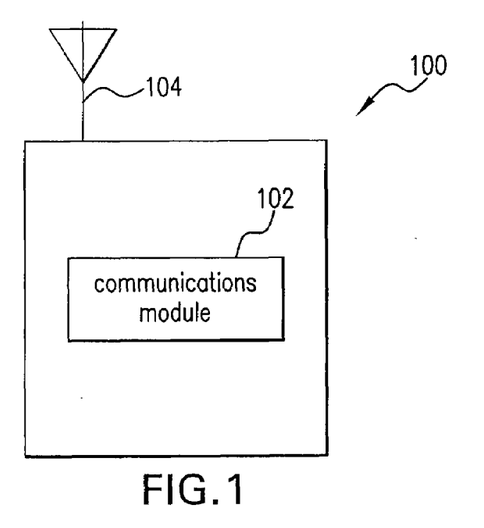
FIG. 1 shows an example mobile communications device, according to an example embodiment of the present invention.

FIG. 1 shows an example mobile communications device 100, according to an example embodiment of the present invention. As shown in FIG. 1, mobile communications device 100 includes a communications module 102 that enhances access to items for a user. Mobile communications device 100 can be a cell phone, a laptop computer, a handheld computing device (e.g., a palm pilot, personal digital assistant (PDA), etc.), or other device adapted to include communications module 102. Alternatively, mobile communications device 100 can be a special purpose device developed with product interaction as its primary function.

As shown in FIG. 1, mobile communications device 100 further includes an antenna 104. In the embodiment of FIG. 1, antenna 104 allows mobile communications device 100 to transmit and receive radio frequency (RF) signals, including communicating with RFID tags and remote computer systems and/or networks.

Figure 2:
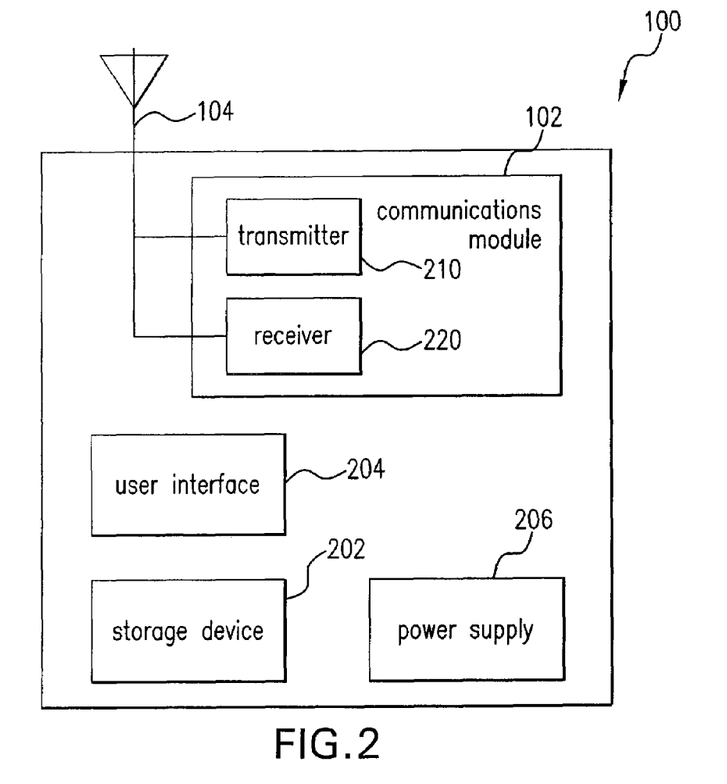
FIG. 2 shows further detail of an example mobile communications device, according to an embodiment of the present invention.

FIG. 2 shows an example mobile communications device 100, including various example components and/or modules. Mobile communications device 100 includes communications module 102, a storage device 202, a user interface 204, and a power supply 206. Communications module 102 includes a transmitter 210 and a receiver 220. Transmitter 210 and receiver 220 may be those that are present in commercial off-the-shelf versions of mobile communications device 100, such as the transmitter and receiver (or transceiver) present in a cell phone. Alternatively, transmitter 210 and receiver 220 may be installed in mobile communications device 100 for use with embodiments of the present invention.

A user of mobile communications device 100 interacts with mobile communications device 100 through user interface 204. For example, user interface 204 can include any combination of one or more buttons, a keyboard, a graphical user interface (GUI), indicator lights, and/or other user input and display devices, for a user to interact with mobile communications device 100, to cause mobile communications device 100 to operate as described herein.

Storage device 202 is used to store information/data for mobile communications device 100. Storage device 202 can be any type of storage medium, including memory circuits (e.g., a RAM, ROM, EEPROM, or FLASH memory), a hard disk/drive, a floppy disk/drive, an optical disk/drive (e.g., CDROM, DVD, etc), etc., and any combination thereof Storage device 202 can be built-in storage of mobile communications device 100, or can be additional storage installed in mobile communications device 100.

Power supply 206 can be any suitable power source for mobile communications device 100, including one or more batteries.

Figure 3:
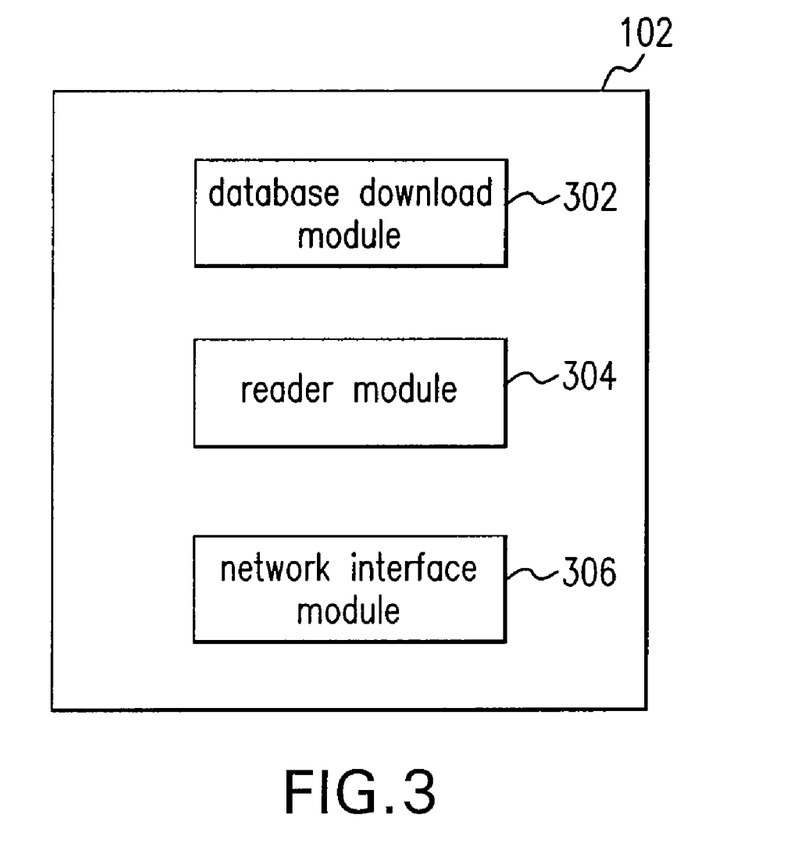
FIG. 3 shows an example embodiment for a communications module of a mobile communications device, according to an embodiment of the present invention.

Communications module 102 includes functionality for communicating with one or more entities, as described herein. FIG. 3 shows an example embodiment for communications module 102. As shown in FIG. 3, communications module 102 includes a database download module 302, a reader module 304, and a network interface module 306. These modules are described in detail below. Modules 302, 304, and 306 include hardware, software, firmware, or any combination thereof, as needed to perform their respective functions. Any combination of one or more of modules 302, 304, and 306 may be included in communications module 102, depending on the particular application.

Figure 4:
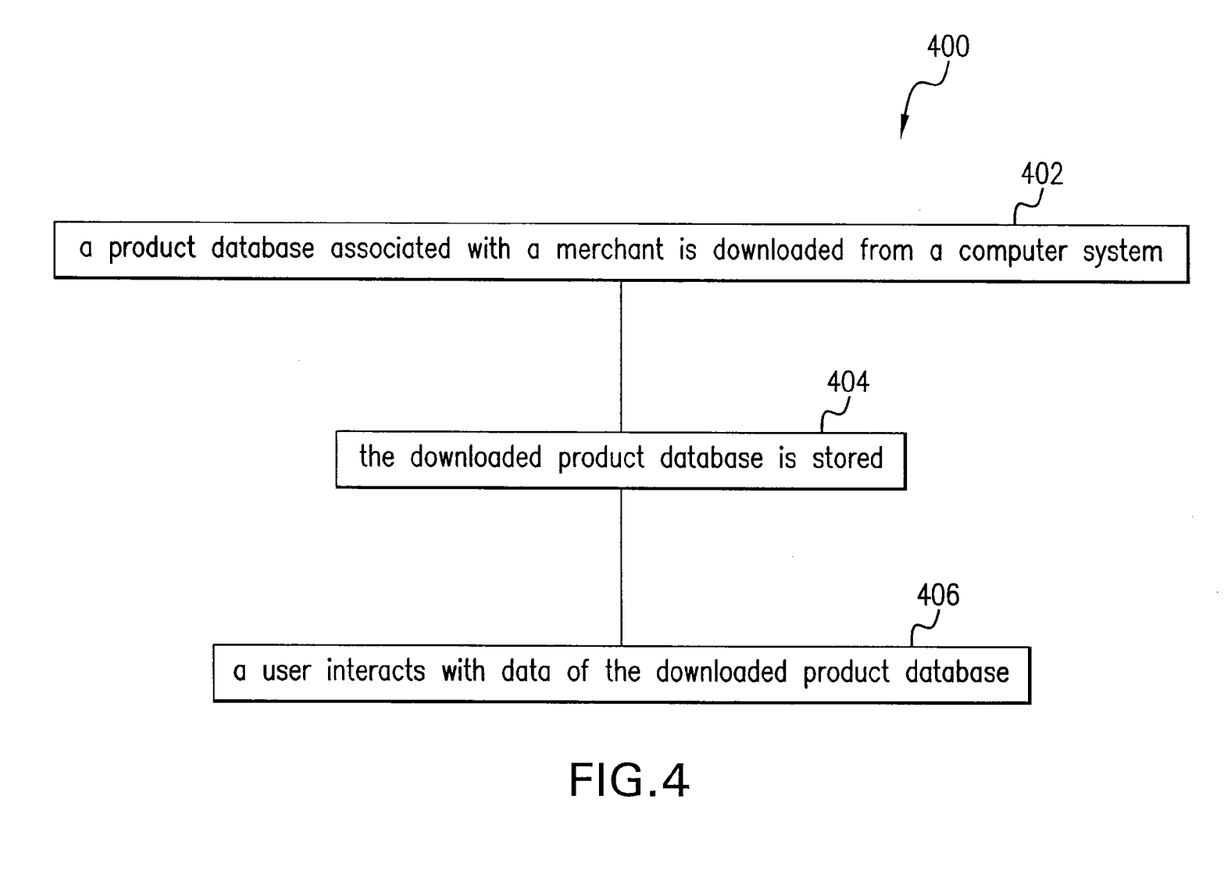
FIG. 4 shows a flowchart providing example steps for interacting with a product database, according to example embodiments of the present invention.
Figure 5:
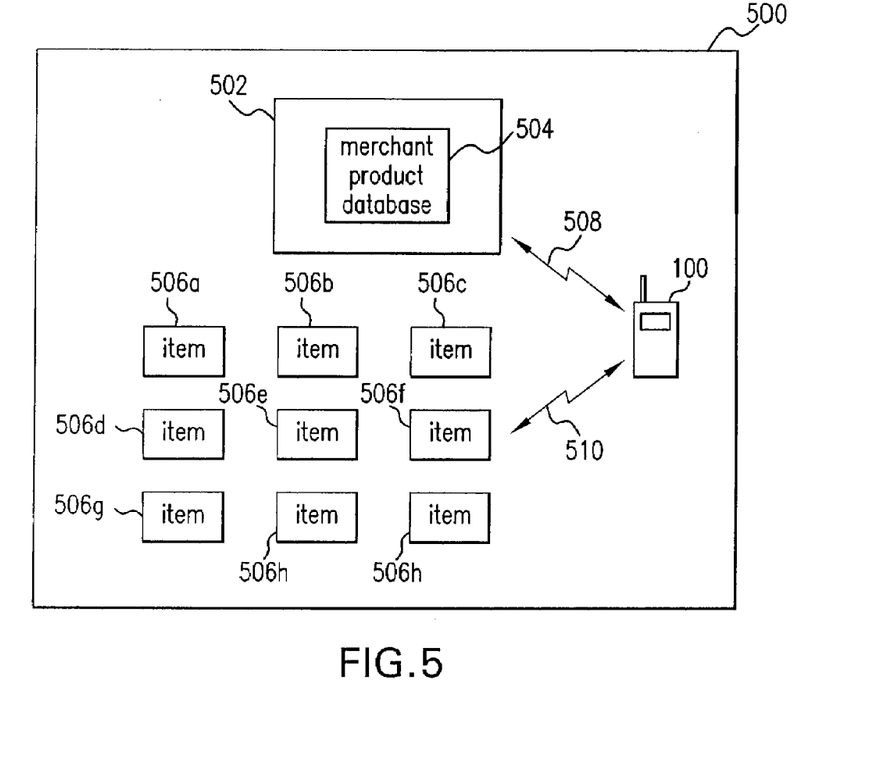
FIG. 5 shows an example block diagram of a merchant's store, according to an embodiment of the present invention.

Database download module 302 may be present in mobile communications device 100 to enable mobile communications device 100 to access a product database, such as the product database of a merchant. FIG. 4 shows a flowchart 400 providing example steps for interacting with a product database, according to example embodiments of the present invention. The steps of flowchart 400 can be performed by embodiments of the mobile communication devices described herein. Other structural and operational embodiments will be apparent to persons skilled in the relevant art(s) based on the following discussion related to flowchart 400. The steps of flowchart 400 are described in detail below, with respect to FIG. 5, for illustrative purposes. FIG. 5 shows an example block diagram of a store 500 of a merchant. Store 500 can be any suitable facility, building, and/or outdoor property, etc., of the merchant where goods are located.

Flowchart 400 begins with step 402. In step 402, a product database associated with a merchant is downloaded from a computer system. For example, as shown in FIG. 5, a computer system 502 is associated with store 500. Furthermore, store 500 includes a plurality of items 506a-506i that the merchant has made available to customers who visit store 500. Computer system 502 stores a merchant product database 504. Merchant product database 504 contains data related to items 506. The data may include a list of all available items 506 for sale, price data for item 506, specification data for items 506, etc., for example.

According to step 402, merchant product database 504 is downloaded to mobile communications device 100. As shown in FIG. 5, communications module 102 communicates with computer system 502 via communications signal 508 to download database 504. Database download module 302 shown in FIG. 3 may be present to control the downloading of database 504 to mobile communications device 100. Communications module 102 may communicate with computer system 502 using any suitable communications protocol, such as an IEEE 802.11 WLAN standard, for example. For example, computer system 502 in store 500 may maintain a wireless LAN. A user of mobile communications device 100 interacts with user interface 204 to initiate the download of database 504 when the user approaches or enters store 500. Alternatively, the download is initiated automatically when the user approaches or enters store 500 with mobile communications device 100.

In step 404, the downloaded product database is stored. For example, merchant product database 504 can be stored in storage device 202 after download.

In step 406, a user interacts with data of the downloaded product database. The user may interact with database 504 in any manner desired. For example, portions or all of database 504 may be displayed on a display of user interface 204.

Figure 6:
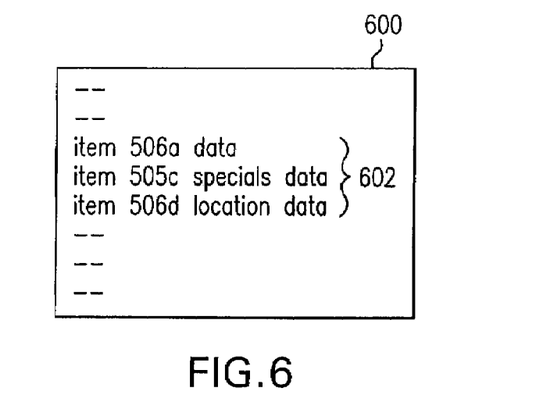
FIG. 6 shows an example user interface of a mobile communications device, according to an embodiment of the present invention.

FIG. 6 shows an example display 600 of user interface 204, showing example data 602. Data 602 may include data related to item 506a, specials data related to item 506c, and location data related to item 506d. Examples of specials data include special prices for an item, including a special price for an item for the particular user of mobile communications device 100 based on prior purchasing history. Example location data includes a location of the particular item in store 500.

Figure 7:
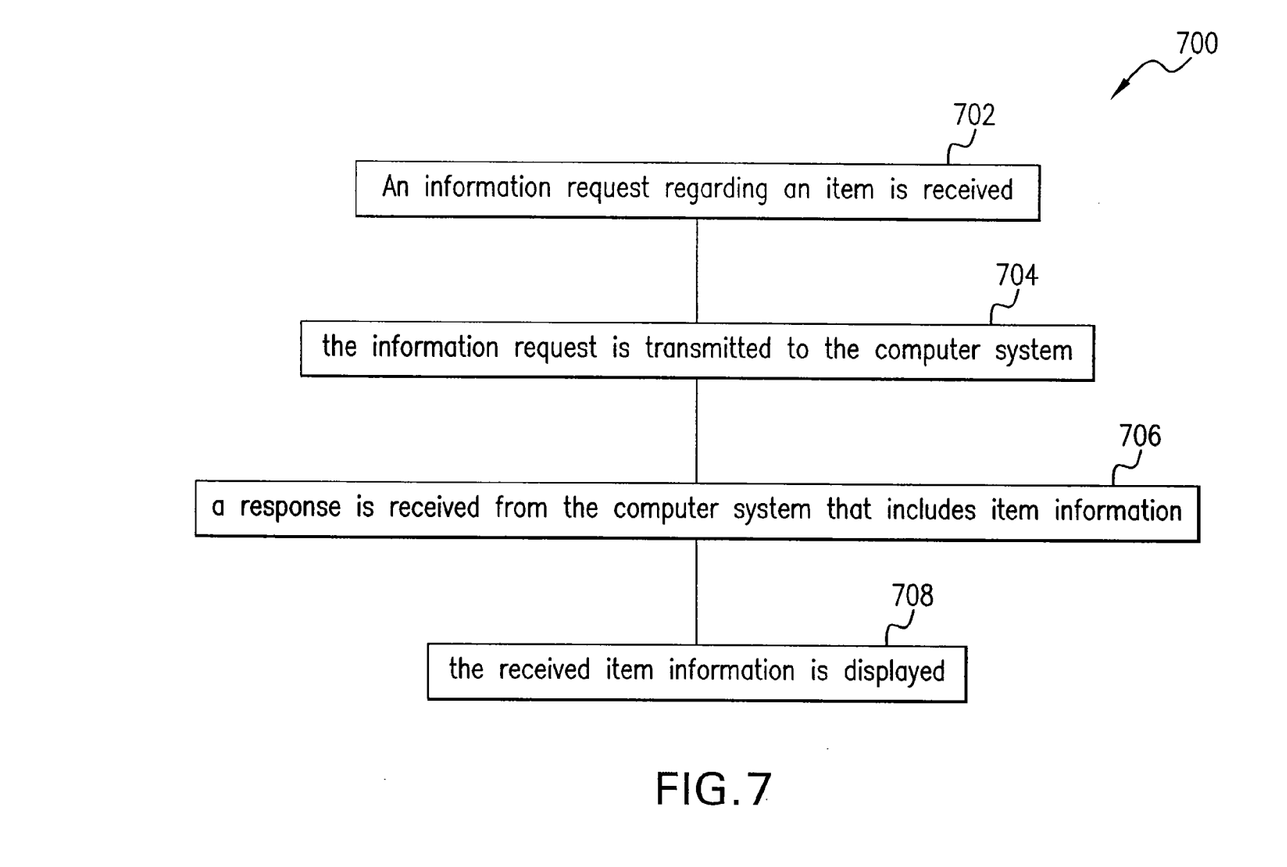
FIG. 7 shows a flowchart providing example steps for requesting information for specific items, according to example embodiments of the present invention.

Furthermore, mobile communications device 100 can be used by a user to request and receive information regarding selected items. FIG. 7 shows a flowchart 700 providing example steps for requesting information for specific items, according to example embodiments of the present invention. The steps of flowchart 700 can be performed by embodiments of the mobile communication devices described herein. Other structural and operational embodiments will be apparent to persons skilled in the relevant art(s) based on the following discussion related to flowchart 700. The steps of flowchart 700 are described in detail below.

Flowchart 700 begins with step 702. In step 702, an information request regarding an item is received. For example, a user interact may interact with user interface 204 to input the information request, such as by voice input, or by manually entering the request via keyboard. Alternatively, as further described below, the user may use mobile communications device 100 to read a tag associated with the item to input the request. For example, FIG. 5 shows an example of mobile communications device 100 attempting a read of a tag (not shown) associated with item 506f, via interrogation signal 510.

In step 704, the information request is transmitted to the computer system. In step 706, a response is received from the computer system that includes item information. For example, as shown in FIG. 5, mobile communications device 100 may communicate with computer system 508 via communications signal 508 to transmit the information request, and to receive the response to the information request.

In step 708, the received item information is displayed. For example, in a similar fashion to the embodiment of FIG. 6, any received item information may be displayed via user interface 204. The item information can include one or more of price data for the item, special price data for the user regarding the item, alternate configurations for the item, specification data for the item, performance data for the item, location data regarding the item in store 500, availability data for the item, and any other data related to the item.

Figure 8:
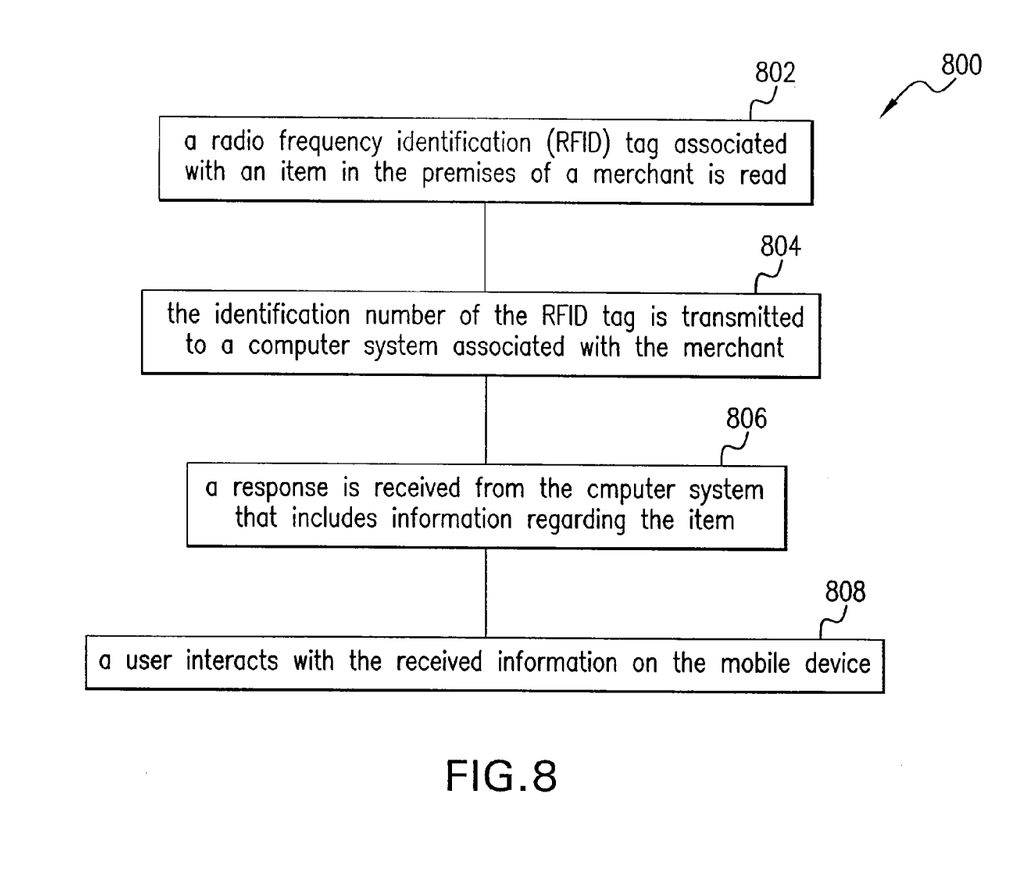
FIG. 8 shows a flowchart providing example steps for requesting information for an item associated with an RFID tag, according to an example embodiment of the present invention.

Furthermore, mobile communications device 100 can be used by a user to interrogate a tag of an item to obtain further information regarding the item. For example, reader module 304 of FIG. 3 may be used to control aspects of such an interrogation. FIG. 8 shows a flowchart 800 providing example steps for requesting information for an item associated with an RFID tag, according to an example embodiment of the present invention. The steps of flowchart 800 can be performed by embodiments of the mobile communication devices described herein. Other structural and operational embodiments will be apparent to persons skilled in the relevant art(s) based on the following discussion related to flowchart 800. The steps of flowchart 800 are described in detail below with respect to FIG. 9, for illustrative purposes.

Figure 9:
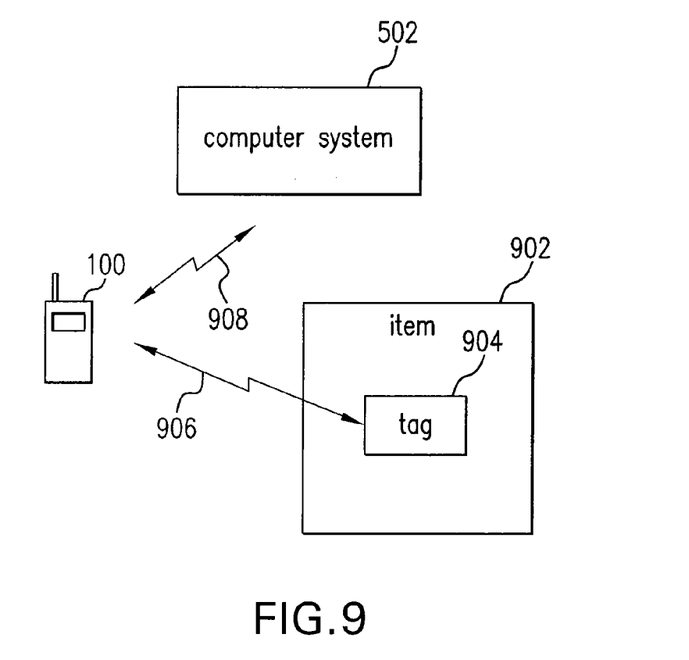
FIG. 9 illustrates an RFID implementation of a mobile communications device, according to an example embodiment of the present invention.

Flowchart 800 begins with step 802. In step 802, a radio frequency identification (RFID) tag associated with an item in the store of a merchant is read. For example, as shown in FIG. 9, reader module 304 of mobile communications device 100 interrogates a tag 902 associated with an item 904 using interrogation signal 906. Tag 902 may be attached directly to item 904, or may be located nearby and be intended to identify item 904. During the interrogation of tag 902, tag 902 provides its identification number (and/or other data) to mobile communications device 100.

In embodiments, reader module 304 performs one or more interrogation/read protocols, as would be known to persons skilled in the relevant art(s), to read tag 902. Examples of such protocols include binary protocols, slotted aloha protocols, and those required by the following standards: Class 0, Class 1, and Gen 2.

In step 804, the identification number of the RFID tag is transmitted to a computer system associated with the merchant. In step 806, a response is received from the computer system that includes information regarding the item. For example, the identification number of tag 902 obtained by mobile communications device 100 is transmitted to computer system 502, and a response is received from computer system 502 via communications signal 908. Computer system 502 associates the identification number stored in tag 902 with item 904. Computer system 502 is able to obtain further data related to item 904 after having received the identification number, due to this association. This further data is received from computer system 502 in step 806 by mobile communications device 100.

Figure 10:
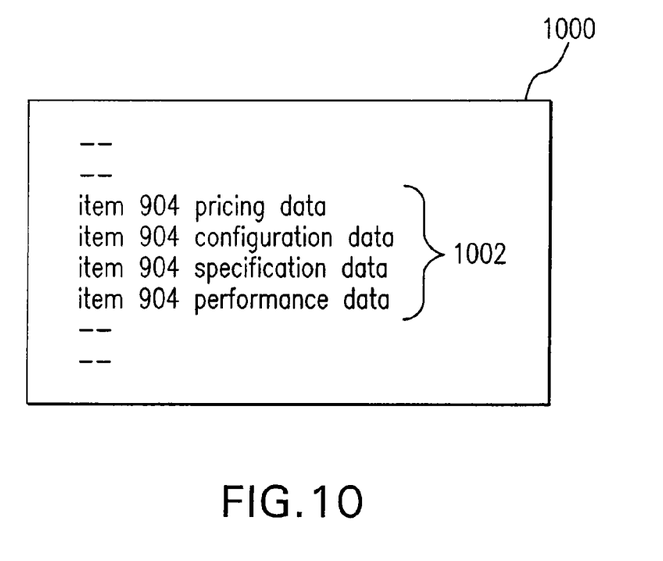
FIG. 10 shows an example user interface of a mobile communications device, according to an embodiment of the present invention.

In step 808, a user interacts with the received information on the mobile device. FIG. 10 shows an example display 1000 of user interface 204, displaying example data 1002 received in step 806. As shown in the example of FIG. 10, data 1002 includes pricing data related to item 904, configuration data related to item 904, specification data related to item 904, and performance data related to item 904. Any relevant received information may be displayed via user interface 204. The item information can include one or more of price data for the item, special price data for the user regarding the item, alternate configurations for the item, specification data for the item, performance data for the item, location data regarding the item in store 500, availability data for the item, and any other data related to the item.

Figure 11:
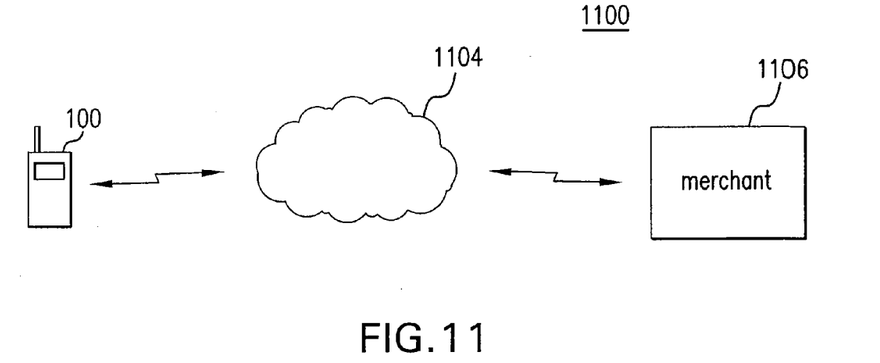
FIG. 11 shows a system for interacting with a merchant over a network using a mobile communications device, according to an example embodiment of the present invention.
Figure 12:
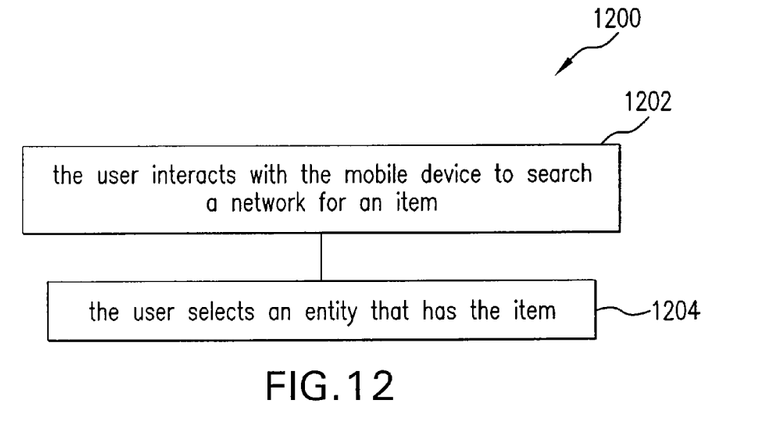
FIGS. 12 and 13 shows flowchart a providing example steps for using a mobile communications device to search for an item, according to example embodiments of the present invention.

Furthermore, mobile communications device 100 can be used by a user to search a network for an item of a merchant. For example, FIG. 11 shows a system 1100 for interacting with a merchant 1106 over a network 1104 using mobile communications device 100, according to an example embodiment of the present invention. In an embodiment, network interface module 306 of FIG. 3 may be used to control aspects of the interaction. FIG. 12 shows a flowchart 1200 providing example steps for using mobile communications device 100 to search for an item over a network, according to an example embodiment of the present invention. The steps of flowchart 1200 can be performed by embodiments of the mobile communication devices described herein. Other structural and operational embodiments will be apparent to persons skilled in the relevant art(s) based on the following discussion related to flowchart 1200. The steps of flowchart 1200 are described in detail below with respect to FIG. 11, for illustrative purposes.

Flowchart 1200 begins with step 1202. In step 1202, the user interacts with the mobile device to search a network for an item. For example, the user may interact with user interface 204 to search for an item. The user can input identifying information regarding the item into user interface 204, or could navigate (e.g., by using a browser) to search for the item over network 1104 and to select the item. Network 1104 may be a wide area network, such as the Internet.

For example, in an embodiment, the user inputs or selects the item in a network accessible database and/or website of merchant 1106. Merchant 1106 determines one or more stores related to merchant 1106 that have the item in stock, and provides a list of the one or more stores to the user on mobile communications device 100.

In step 1204, the user selects an entity that has the item. For example, the user selects a particular store, such as a nearest store, that has the item, from the list provided by merchant 1106. In an embodiment, selecting the item notifies the particular store of the merchant 1106 to hold the item and/or that the user will be visiting the store.

Figure 13:
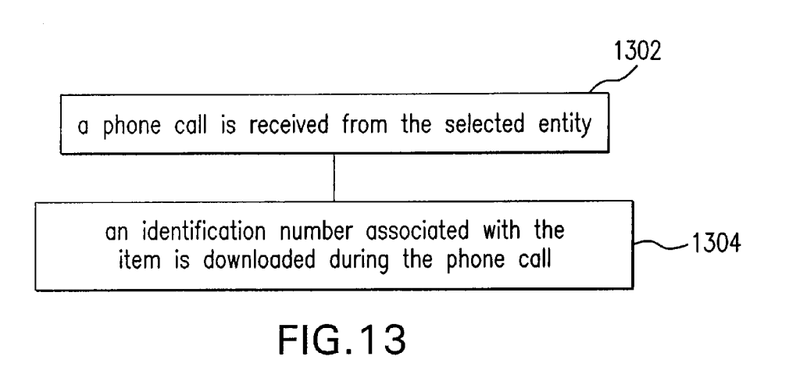

Flowchart 1300 shows alternative steps for flowchart 1200, according to an example embodiment of the present invention. In step 1302, a phone call is received from the selected entity. For example, a computer system of merchant 1106 calls mobile communications device 100.

In step 1304, an identification number associated with the item is downloaded during the phone call. For example, in this manner, the computer system of merchant 1106 can provide the location of a particular store of the merchant that has the item, and/or other information, to the user.

In an embodiment, when the user approaches or enters the store of merchant 1106, the computer system of merchant 1106 communicates with mobile communications device 100 to provide a location of the desired item in the store of merchant 1106 to the user.

2.1 Example Mobile Communication Device Embodiments

Figure 14:
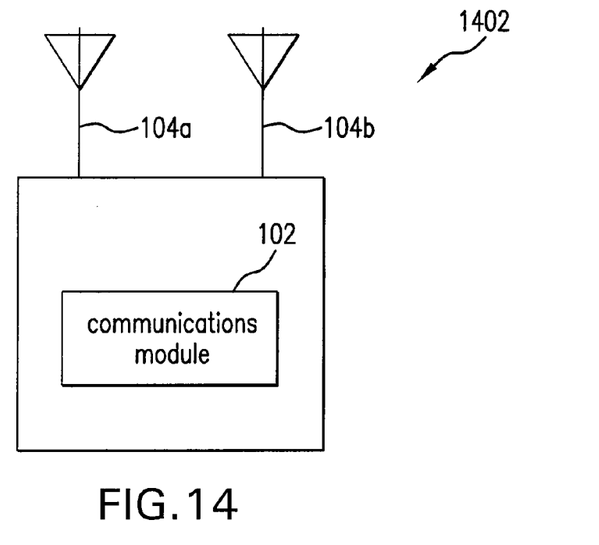
FIGS. 14 and 15 show example mobile communications devices, according to embodiments of the present invention.
Figure 15:
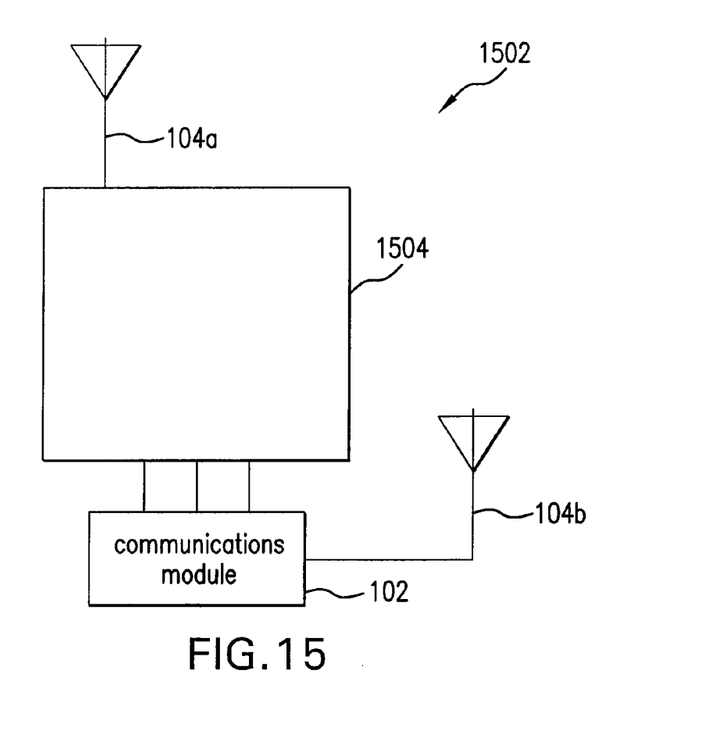

As described above, FIG. 1 shows an exemplary mobile communication device 100. Further examples for mobile communication device 100 are shown in FIGS. 14 and 15, according to embodiments of the present invention. The mobile communications devices of FIGS. 1, 14, and 15 show various ways that communications module 102 and antenna(s) 104 may be incorporated into, or associated with a mobile communications device, for illustrative purposes. Further configurations for mobile communications devices will be understood to persons skilled in the relevant art(s) from the teachings herein. As described above, a mobile communications device of the present invention can be a commercially available device, such as a cell phone or PDA, that is adapted to include the functionality of communications module 102, or can be a special purpose device.

As shown in FIG. 1, communications module 102 is integrated into mobile communications device 100. Thus, for example, communications module 102 may include hardware, software, firmware, or any combination thereof. Communications module 102 can include software or firmware that is downloaded into mobile communications device 100.

Furthermore, as shown in FIG. 1, mobile communications device 100 has a single antenna 104. Thus, in the embodiment of FIG. 1, antenna 104 is configured to transmit and/or receive signals of the frequencies required by mobile communications device 100. For example, if mobile communications device 100 is a cell phone, antenna 104 is configured to transmit and/or receive signals in cell phone frequency ranges. Furthermore, antenna 104 is configured to transmit and/or receive signals in a frequency range required by the RFID features of mobile communications device 100. Thus, antenna 104 can transmit RFID reader frequencies and can receive tag responses.

FIG. 14 shows a mobile communications device 1402. As shown in FIG. 14, mobile communication device 1402 includes communications module 102. Thus, similarly to mobile communications device 100 of FIG. 1, communications module 102 includes software, hardware, firmware, or any combination thereof, stored or housed in mobile communications device 1402.

As shown in FIG. 14, mobile communications device 1402 has a first antenna 104*a* and a second antenna 104*b*. In the embodiment of FIG. 14, first antenna 104*a* is used to transmit and/or receive signals of a first frequency range, and second antenna 104*b* is used to transmit and/or receive signals of a second frequency range. For example, first antenna 104*a* may be used to allow mobile communications device 1402 to operate as a cell phone. Thus, first antenna 104*a* is configured to transmit and/or receive signals in cell phone frequency ranges. Furthermore, second antenna 104*b* is configured to transmit and/or receive signals in a frequency range required by the RFID features of mobile communications device 1402. Mobile communications devices can have additional antennas, if desired and/or needed.

FIG. 15 shows a mobile communications device 1502. As shown in FIG. 15, communications module 102 is an external plug-in module that attaches to mobile communications device 1502. Communications module 102 plugs into an interface of mobile communications device 1502, such as a serial port, a parallel port, a USB port, or other data port or interface type. The interface can be an accessory port, an infrared port, or any other interface or port capable of transferring data to and from mobile communications device 1002 such as a wireless phone data/software interface.

Furthermore, as shown in FIG. 15, communications module 102 includes an optional second antenna 104*b*. By attaching communications module 102 (with second antenna 104*b*) to a commercially available mobile communications device 1504 having a single antenna, such as a cell phone, the device can be converted into a multi-antenna device capable of communicating at cell phone and RFID reader/tag frequency ranges.

2.2 Exemplary Tag Device

Figure 16:
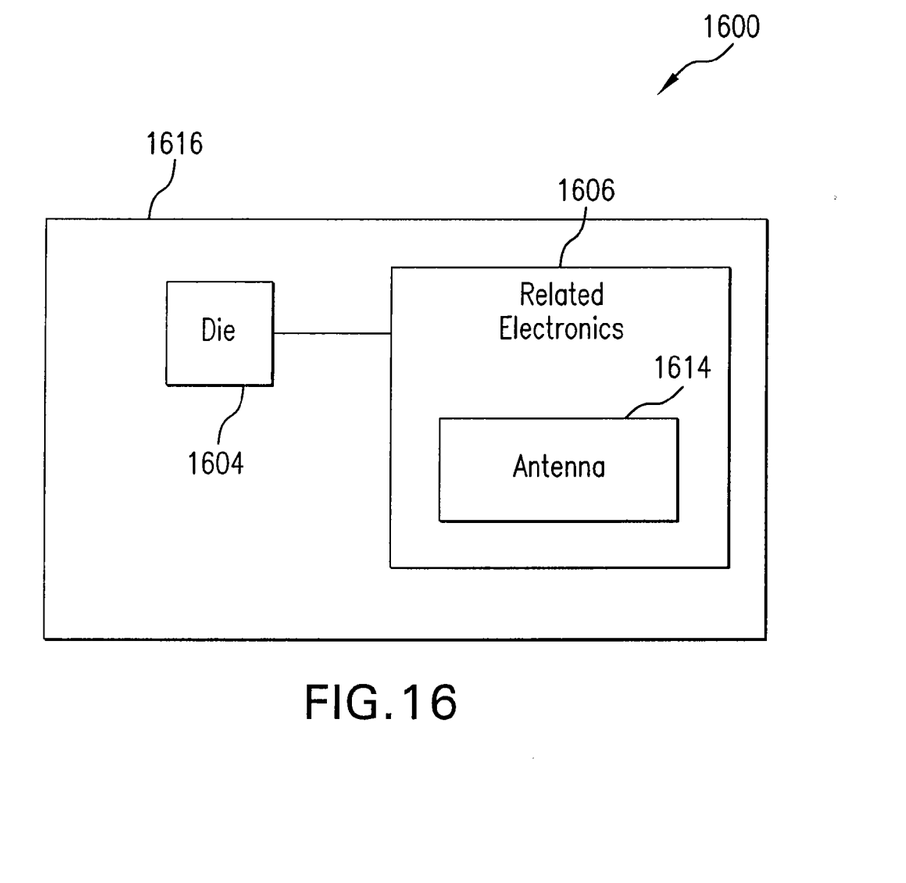
FIG. 16 shows a block diagram of an exemplary RFID tag, according to an embodiment of the present invention.

The present invention is directed to all types of RFID tag devices. FIG. 16 shows a block diagram of an exemplary RFID tag 1600, according to an embodiment of the present invention. As shown in FIG. 16, RFID tag 1600 includes a die 1604 and related electronics 1606 located on a tag substrate 1616. Related electronics 1606 includes an antenna 1614 in the present example. Die 1604 can be mounted onto antenna 1614 of related electronics 1606, or on other locations of substrate 1616. As is further described elsewhere herein, die 1604 may be mounted in either a pads up or pads down orientation.

RFID tag 1600 may be located in an area having a large number, population, or pool of RFID tags present. Tag 1600 receives interrogation signals transmitted by one or more tag readers. According to interrogation protocols, tag 1600 responds to these signals. The response(s) of tag 1600 includes information that the reader can use to identify the corresponding tag 1600. Once the tag 1600 is identified, the existence of tag 1600 within a coverage area defined by the tag reader is ascertained.

RFID tag 1600 may be used in various applications, such as inventory control, airport baggage monitoring, as well as security and surveillance applications. Thus, tag 1600 can be affixed to items such as airline baggage, retail inventory, warehouse inventory, automobiles, compact discs (CDs), digital video discs (DVDs), video tapes, other goods, and other objects. Tag 1600 enables location monitoring and real time tracking of such items.

In the present embodiment, die 1604 is an integrated circuit that performs RFID operations, such as communicating with one or more tag readers (not shown) according to various interrogation protocols. Exemplary interrogation protocols are described in U.S. Pat. No. 6,002,344 issued Dec. 14, 1999 to Bandy et al. entitled System and Method for Electronic Inventory, and U.S. patent application Ser. No. 10/072,885, filed on Feb. 12, 2002, both of which are incorporated by reference herein in their entirety. Example protocols include Class 0, Class 1, EPC Gen 2, and further protocols. Die 1604 includes a plurality of contact pads that each provide an electrical connection with related electronics 1606.

Related electronics 1606 are connected to die 1604 through a plurality of contact pads of IC die 1604. When present, related electronics 1606 provide one or more capabilities, including RF reception and transmission capabilities, impedance matching, sensor functionality, power reception and storage functionality, as well as additional capabilities.

As shown in FIG. 16, tag substrate 1616 has a first surface that accommodates die 1604, related electronics 1606, as well as further components of tag 1600. Tag substrate 1616 also has a second surface that is opposite the first surface. An adhesive material and/or backing can be included on the second surface. When present, an adhesive backing enables tag 1600 to be attached to objects, such as books, containers, and consumer products.

3.0 Conclusion

While various embodiments of the present invention have been described above, it should be understood that they have been presented by way of example, and not limitation. It will be apparent to persons skilled in the relevant arts that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A mobile device, comprising:
   at least one antenna;
   a storage device;
   a user interface;
   a communications module coupled to said at least one antenna, wherein the communications module is configured to download a product database from a computer system of a merchant through the at least one antenna upon interaction by a user with the user interface; and
   a reader module coupled to said at least one antenna configured to read a radio frequency identification (RFID) tag to determine an identification number corresponding to the RFID tag;
   wherein the product database includes data associated with items on sale by the merchant;
   wherein the storage device stores the downloaded product database; and
   wherein the user interface enables display of data from the downloaded product database.

2. The mobile device of claim 1, wherein the communications module is further configured to transmit the identification number of the RFID tag to the computer system, and to receive a response from the computer system that includes information regarding an item associated with the RFID tag.

3. The mobile device of claim 2, wherein the user interface enables display of the received information.

4. The mobile device of claim 1, wherein the user interface enables a user of the mobile device to input an information request to the mobile device regarding an item;
   wherein the communications module is further configured to transmit the information request to the computer system, and to receive a response from the computer system that includes item information regarding the information request; and
   wherein the user interface enables the display of the received item information.

5. The mobile device of claim 4, wherein the item information includes at least one of price data for the item, special price data for the user regarding the item, alternate configurations for the item, specification data for the item, performance data for the item, location data regarding the item in a store of the merchant, and availability data for the item.

6. The mobile device of claim 1, wherein the communications module comprises a network interface module coupled to the at least one antenna.

7. The mobile device of claim 6, wherein the user interface enables a user of the mobile device to search a network for an item through the network interface module, wherein the user interface enables the user to select an entity that has the item.

8. The mobile device of claim 7, wherein the user interface enables the user to select an entity that has the item to notify the selected entity that the user desires the item.

9. The mobile device of claim 7, wherein the communications module is further configured to receive a phone call from the selected entity, and to transmit an identification number associated with the item to the selected entity during the phone call.

10. The mobile device of claim 7, wherein the communications module is further configured to download information from the computer system regarding a location of the item in a store associated with the merchant.

11. The mobile device of claim 1, wherein the mobile device is a cell phone, a mobile hand-held computer, or a personal digital assistant (PDA).

12. The mobile device of claim 1, wherein the RFID tag is associated with an item.

13. A method for enhanced shopping by a user, comprising:
   (a) downloading a product database associated with a merchant from a computer system into a mobile device;
   (b) storing the downloaded product database;
   (c) enabling a user to interact with data of the downloaded product database on the mobile device to provide to the user information regarding at least one item on sale by the merchant; and
   (d) reading a radio frequency identification (RFID) tag with the mobile device to determine an identification number corresponding to the RFID tag.

14. The method of claim 13, further comprising:
   (e) transmitting the identification number of the RFID tag to the computer system; and
   (f) receiving a response from the computer system that includes information regarding an item associated with the RFID tag.

15. The method of claim 14, further comprising:
   (g) displaying the received information on the mobile device.

16. The method of claim 13, wherein step (a) comprises:
   enabling a user to interact with a user interface of the mobile device to initiate the downloading.

17. The method of claim 13, further comprising:
   (d) enabling the user to input an information request to the mobile device regarding an item;
   (e) transmitting the information request to the computer system;
   (f) receiving a response from the computer system that includes item information regarding the information request; and
   (g) displaying the received item information.

18. The method of claim 17, wherein step (f) comprises receiving the item information that includes at least one of price data for the item, special price data for the user regarding the item, alternate configurations for the item, specification data for the item, performance data for the item, location data regarding the item in a store of the merchant, and availability data for the item.

19. The method of claim 13, further comprising:
   (d) enabling the user to interact with the mobile device to search a network for an item; and
   (e) enabling the user to select an entity that has the item.

20. The method of claim 19, wherein step (e) comprises:
   enabling the user to select the entity that has the item to notify the selected entity that the user desires the item.

21. The method of claim 19, further comprising:
   (f) receiving a phone call from the selected entity; and
   (g) transmitting an identification number associated with the item to the selected entity during the phone call.

22. The method of claim 19, further comprising:
   (f) downloading information from the computer system regarding a location of the item in a store associated with the merchant.

23. The method of claim 13, further comprising:
   (d) prior to step (a), entering a store of the merchant with the mobile device.

24. A mobile device, comprising:
   at least one antenna;
   a storage device;
   a user interface;
   a reader module coupled to said at least one antenna configured to read a radio frequency identification (RFID) tag associated with an item in a store of a merchant to determine an identification number corresponding to the RFID tag; and
   a communications module coupled to said at least one antenna, wherein the communications module is configured to transmit the identification number of the RFID tag to a computer system of the merchant through the at least one antenna upon interaction by a user with the user interface, and to receive a response from the computer system that includes information regarding the item;
   wherein the storage device stores the received information;
   wherein the user interface enables display of the received information.

25. The mobile device of claim 24, wherein the mobile device is a cell phone, a mobile hand-held computer, or a personal digital assistant (PDA).

26. The mobile device of claim 24, wherein the received information includes at least one of price data for the item, special price data for the user regarding the item, alternate configurations for the item, specification data for the item, and performance data for the item.

27. A method for enhanced shopping by a user, comprising:
   (a) reading with a mobile device a radio frequency identification (RFID) tag associated with an item in the store of a merchant to determine an identification number corresponding to the RFID tag;
   (b) transmitting the identification number of the RFID tag from the mobile device to a computer system associated with the merchant;
   (c) receiving a response that includes information regarding the item at the mobile device from the computer system; and
   (d) enabling a user to interact with the received information on the mobile device to provide to the user information regarding the item.

28. The method of claim 27, wherein step (c) comprises:
   receiving the information that includes at least one of price data for the item, special price data for the user regarding the item, alternate configurations for the item, specification data for the item, and performance data for the item.

\* \* \* \* \*